(12) United States Patent
Moore et al.

(10) Patent No.: US 7,899,989 B2
(45) Date of Patent: Mar. 1, 2011

(54) METHOD AND SYSTEM FOR USING A BLOCK ALLOCATION POLICY

(75) Inventors: William H. Moore, Fremont, CA (US); Jeffrey S. Bonwick, Los Altos, CA (US)

(73) Assignee: Oracle America, Inc., Redwood City, CA (US)

( * ) Notice: Subject to any disclaimer, the term of this patent is extended or adjusted under 35 U.S.C. 154(b) by 205 days.

(21) Appl. No.: 11/407,637

(22) Filed: Apr. 20, 2006

(65) Prior Publication Data

US 2007/0106865 A1 May 10, 2007

Related U.S. Application Data

(60) Provisional application No. 60/733,381, filed on Nov. 4, 2005.

(51) Int. Cl.
*G06F 12/08* (2006.01)

(52) U.S. Cl. ......... 711/117; 711/118; 711/170; 711/173; 711/114; 711/154; 711/162; 711/129; 711/153; 714/6; 714/710; 714/770; 714/819

(58) Field of Classification Search .................. 711/117, 711/170, 173, 114, 154, 162, 129, 118, 153; 714/6, 710, 770, 819
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 6,209,111 B1 | 3/2001 | Kadyk et al. | |
| 6,341,341 B1 | 1/2002 | Grummon et al. | |
| 6,745,284 B1 | 6/2004 | Lee et al. | |
| 6,745,305 B2 | 6/2004 | McDowell | |
| 6,769,052 B2 * | 7/2004 | Chauvel et al. | 711/154 |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |
| 7,007,196 B2 | 2/2006 | Lee et al. | |
| 7,032,154 B2 | 4/2006 | Kidorf et al. | |

(Continued)

OTHER PUBLICATIONS

Austin, B. "A Dynamic Disc Allocation Algorithm Designed to Reduce Fragmentation During Filing Reloading", Information Sciences Laboratory, Corporate Research and Development Center, General Electric Company, 4 pages, 1970.

(Continued)

*Primary Examiner* — Sanjiv Shah
*Assistant Examiner* — Midys Rojas
(74) *Attorney, Agent, or Firm* — Osha • Liang LLP

(57) ABSTRACT

A method for writing a logical block into a storage pool includes receiving a request to write the logical block, selecting a block allocation policy, by a file system associated with the storage pool, from a set of allocation policies, obtaining a list of free physical blocks in the storage pool, allocating a physical block from the list of free physical blocks, based on the block allocation policy, and writing the logical block to the physical block.

20 Claims, 6 Drawing Sheets

U.S. PATENT DOCUMENTS

| | | | |
|---|---|---|---|
| 7,043,677 | B1 | 5/2006 | Li |
| 7,133,964 | B2 | 11/2006 | Rodrigues et al. |
| 7,162,486 | B2 | 1/2007 | Patel et al. |
| 7,174,352 | B2 | 2/2007 | Kleiman et al. |
| 7,200,715 | B2 | 4/2007 | Kleiman et al. |
| 7,281,188 | B1* | 10/2007 | Bonwick et al. ............. 714/752 |
| 7,343,518 | B2* | 3/2008 | Yeo ................................ 714/18 |
| 7,603,568 | B1* | 10/2009 | Ahrens et al. ................ 713/193 |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0161972 | A1 | 10/2002 | Talagala et al. |
| 2003/0033477 | A1 | 2/2003 | Johnson et al. |
| 2003/0126107 | A1 | 7/2003 | Yamagami |
| 2003/0145167 | A1 | 7/2003 | Tomita |
| 2003/0229767 | A1* | 12/2003 | Lee et al. ...................... 711/154 |
| 2004/0098424 | A1* | 5/2004 | Seidenberg et al. .......... 707/204 |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2005/0010620 | A1* | 1/2005 | Silvers et al. ................. 707/205 |
| 2005/0097270 | A1 | 5/2005 | Kleiman et al. |
| 2005/0235154 | A1 | 10/2005 | Serret-Avila |
| 2006/0168409 | A1 | 7/2006 | Kahn et al. |
| 2006/0218644 | A1 | 9/2006 | Niles et al. |
| 2006/0256965 | A1 | 11/2006 | Rowe |

OTHER PUBLICATIONS

Goodheart, B., Cox, J. "The Magic Garden Explained", Prentice Hall, 8 pages, 1994.

Stallings, W. "Computer Organization and Architecture: Designing for Performance", Prentice Hall, 4 pages, 2000.

Stallings, W.; "Computer Organization and Architecture: Designing for Performance"; Prentice Hall, pp. 377-378, 2000.

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore— 560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

* cited by examiner

METHOD AND SYSTEM FOR USING A BLOCK ALLOCATION POLICY

CROSS-REFERENCE TO RELATED APPLICATIONS

This application claims benefit of U.S. Provisional Application Ser. No. 60/733,381 filed on Nov. 4, 2005, entitled "Block Allocation" in the names of Jeffrey S. Bonwick, William H. Moore, and Matthew A. Ahrens, which is hereby incorporated by reference.

This application is related to copending U.S. Pat. No. 7,877,554, filed on Apr. 19, 2006 and entitled "Method and System for Block Reallocation" and copending U.S. patent application Ser. No. 11/407,772, filed on Apr. 19, 2006 and entitled "Method and System for Latency Directed Block Allocation," the entire contents of which are incorporated herein by reference. All the referenced applications are co-owned by the same assignee.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; and "Automatic Conversion of All-Zero Data Storage Blocks into File Holes" (application Ser. No. 10/853,915) filed on May 26, 2004.

BACKGROUND

A typical computer system includes one or more storage devices, e.g., volatile memory, hard disk, removable media, etc. Such storage devices are typically used to store and/or access data for using and/or operating the computer system. For example, a storage device may contain user data, operating system data, file system data, application files, temporary files, cache data, etc.

To allow for storing of data, storage devices are typically separated into segments, or physical blocks, defining physical locations on the storage devices. For example, a 1024 KB removable media device may be separated into 256 blocks of 4 KB each. The aforementioned segmentation of a storage device may be based on a physical property of the storage device, e.g., the size of a sector on a disk or any other physical property of the storage device, or may simply be a logical segmentation, e.g., wherein segments include multiple disk sectors. There are many different schemes, based on physical and/or logical properties, for segmenting a storage device.

If more than one storage device is combined, for example in a stripe or mirror, then a volume manager is used to manage the relationship between the storage devices. More specifically, the volume manager creates a logical representation of the storage devices, whereby the storage devices appear as only a single storage device to a file system using the storage pool. Accordingly, the file system accesses the storage pool using logical offsets (i.e., addresses of physical blocks), which the volume manager translates to physical locations on specific storage devices. For example, if a storage pool includes two 500 MB disks, and the file system requests data from offset 501 MB, then the volume manager reads the data from offset 1 MB on the second disk.

Once a storage device is segmented into physical blocks, the file system (or a process associated therewith) must track which physical blocks are available for use. Accordingly, the file system maintains a block allocation map, indicating which of the physical blocks in the storage pool (i.e., physical blocks at each logical offset, as describe above) have been allocated, and which physical blocks are free to be allocated. When writing data to the storage pool, the selection of which physical block(s) to allocate is typically based on physical block availability, i.e., which blocks in the block allocation map are marked as free. Once the physical block(s) has been allocated, the block allocation map is updated to reflect that the physical block(s) is no longer free and the data is written to the physical block(s). Those skilled in the art will appreciate that in this arrangement, the file system is not aware of the specific physical layout of the storage pool, and the volume manager does not have access to the block allocation map.

The following is a brief explanation of how data may be stored in a storage pool. Initially, the file system receives a request to write the data to the storage pool. Upon receiving the request, the file system allocates a physical block (i.e., a physical block at a logical offset, as described above), using a block allocation map to identify a free physical block. Subsequently, the file system requests that the volume manager store the data at the determined logical offset. The volume manager translates the logical offset to a physical location on a specific storage device, and writes the data to that location.

When the targeted storage device is offline, data cannot be written to the storage device. If a first storage device fails while a second storage device remains online, then the devices are said to belong to separate "fault domains." In other words, a failure of the first storage device does not necessarily imply a failure of the second storage device. Those skilled in the art will appreciate that because the file system only accesses a logical representation of the storage pool, provided by the volume manager, the file system does not have any awareness of the fault domains in the storage pool. Thus, if an attempt to write data fails, the file system cannot select an alternate location to store the data. Further, because the file system maintains the block allocation map, and because the file system requested that the data be written at a specific logical offset, the volume manager also cannot select an alternate location to store the data. Thus, the write fails.

SUMMARY

In general, in one aspect, the invention relates to a method for writing a logical block into a storage pool, comprising receiving a request to write the logical block, selecting a block allocation policy, by a file system associated with the storage pool, from a plurality of allocation policies, obtaining a list of free physical blocks in the storage pool, allocating a physical block from the list of free physical blocks, based on the block allocation policy, and writing the logical block to the physical block.

In general, in one aspect, the invention relates to a system comprising a storage pool, and a file system operatively connected to the storage pool and configured to receive a request to write a logical block, select a block allocation policy from a plurality of allocation policies, obtain a list of free physical blocks in the storage pool, allocate a physical block from the list of free physical blocks based on the block allocation policy, and write the logical block to the physical block.

In general, in one aspect, the invention relates to a computer readable medium comprising executable instructions for writing a logical block into a storage pool by receiving a request to write the logical block, selecting a block allocation policy, by a file system associated with the storage pool, from a plurality of allocation policies, obtaining a list of free physical blocks in the storage pool, allocating a physical block from the list of free physical blocks based on the block allocation policy, and writing the logical block to the physical block.

Other aspects of the invention will be apparent from the following description and the appended claims.

DETAILED DESCRIPTION

Figure 1:
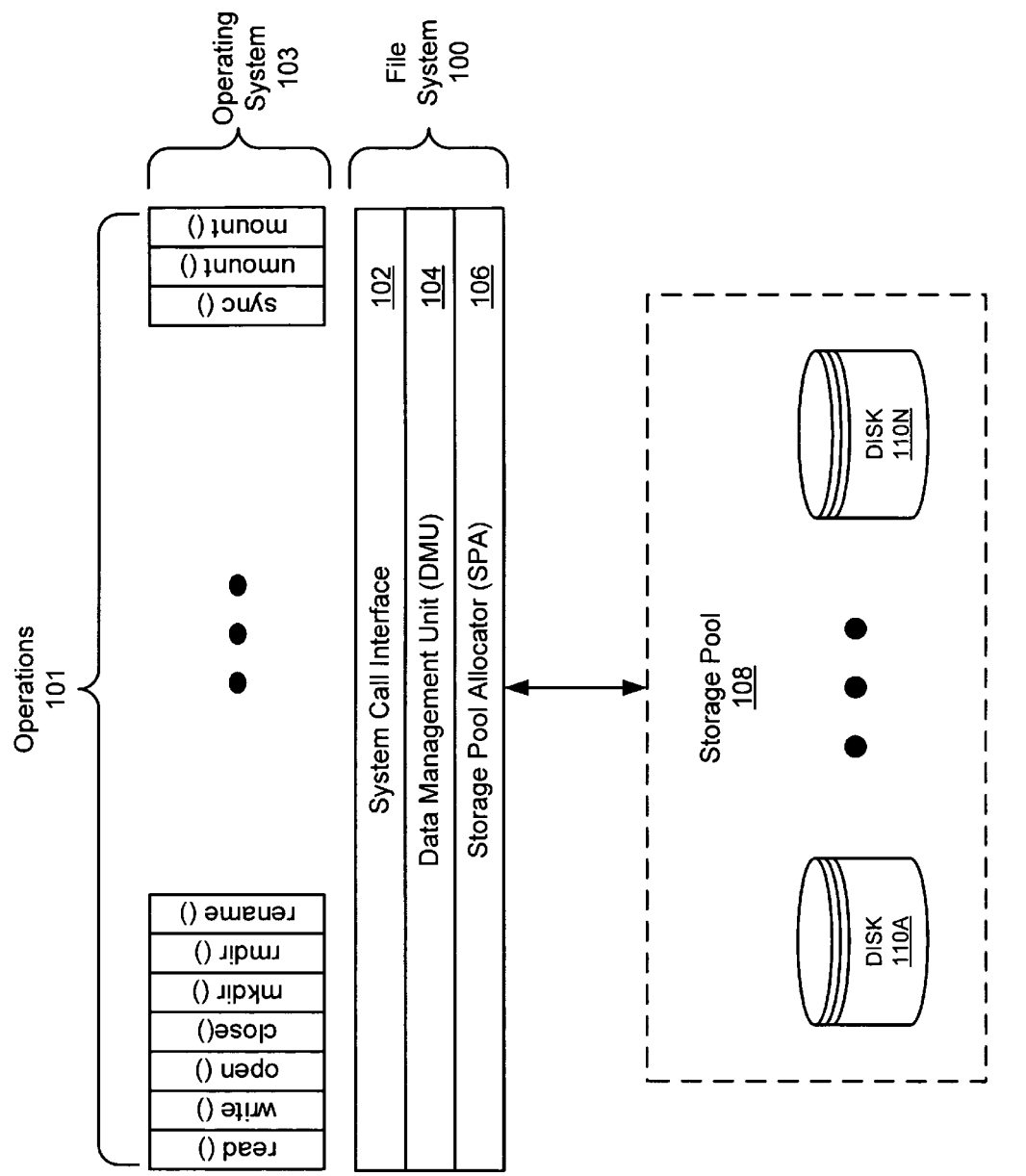
FIG. 1 shows a diagram of a system architecture in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to allocate a physical block in a storage pool to store a logical block, based on metadata associated with the logical block.

FIG. 1 shows a diagram of a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into input/output (hereinafter "I/O") requests allowing related blocks to be forwarded to the SPA (106) together. The SPA (106) receives transactions from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
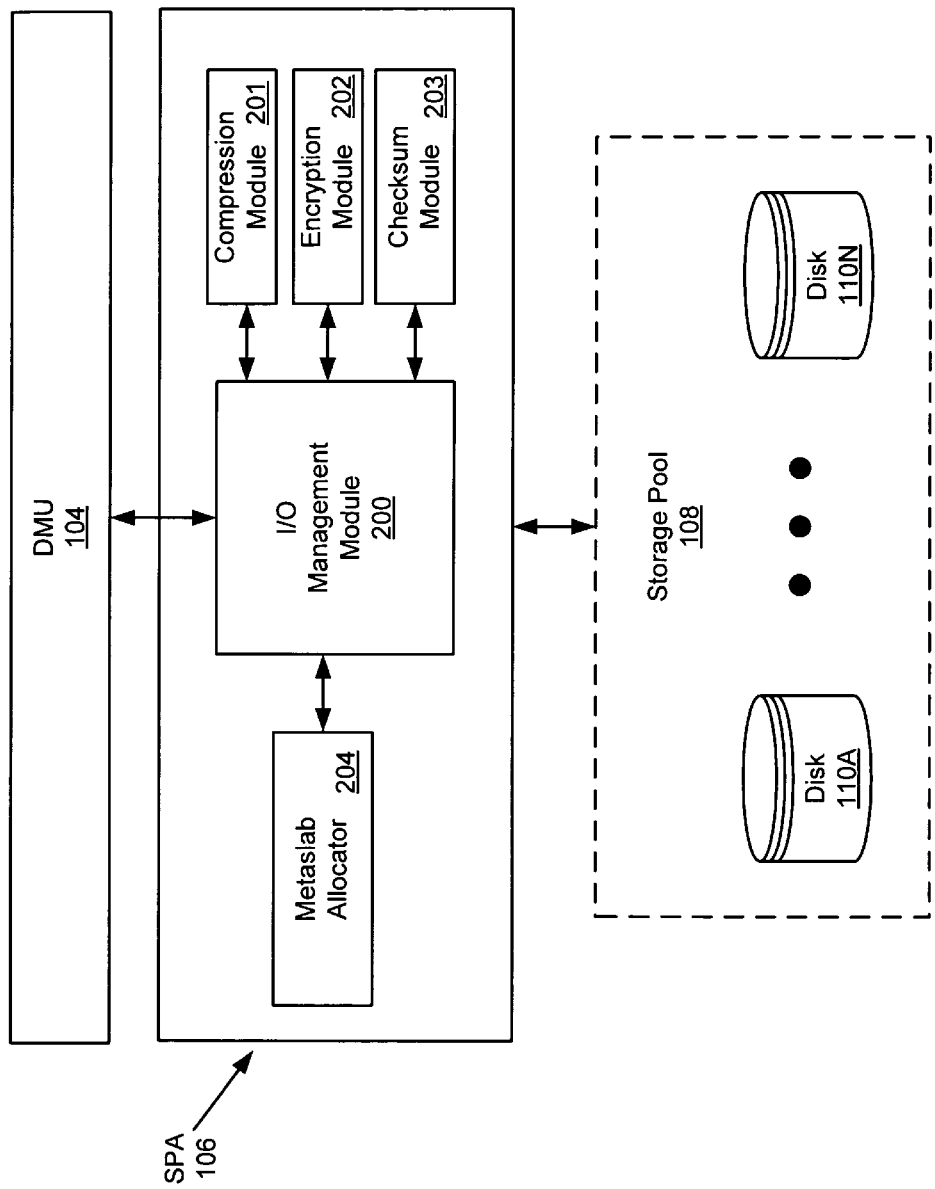
FIG. 2 shows a diagram of a storage pool allocator in accordance with one embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8 KB (kilobytes) may be compressed to a size of 2 KB for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes.

The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
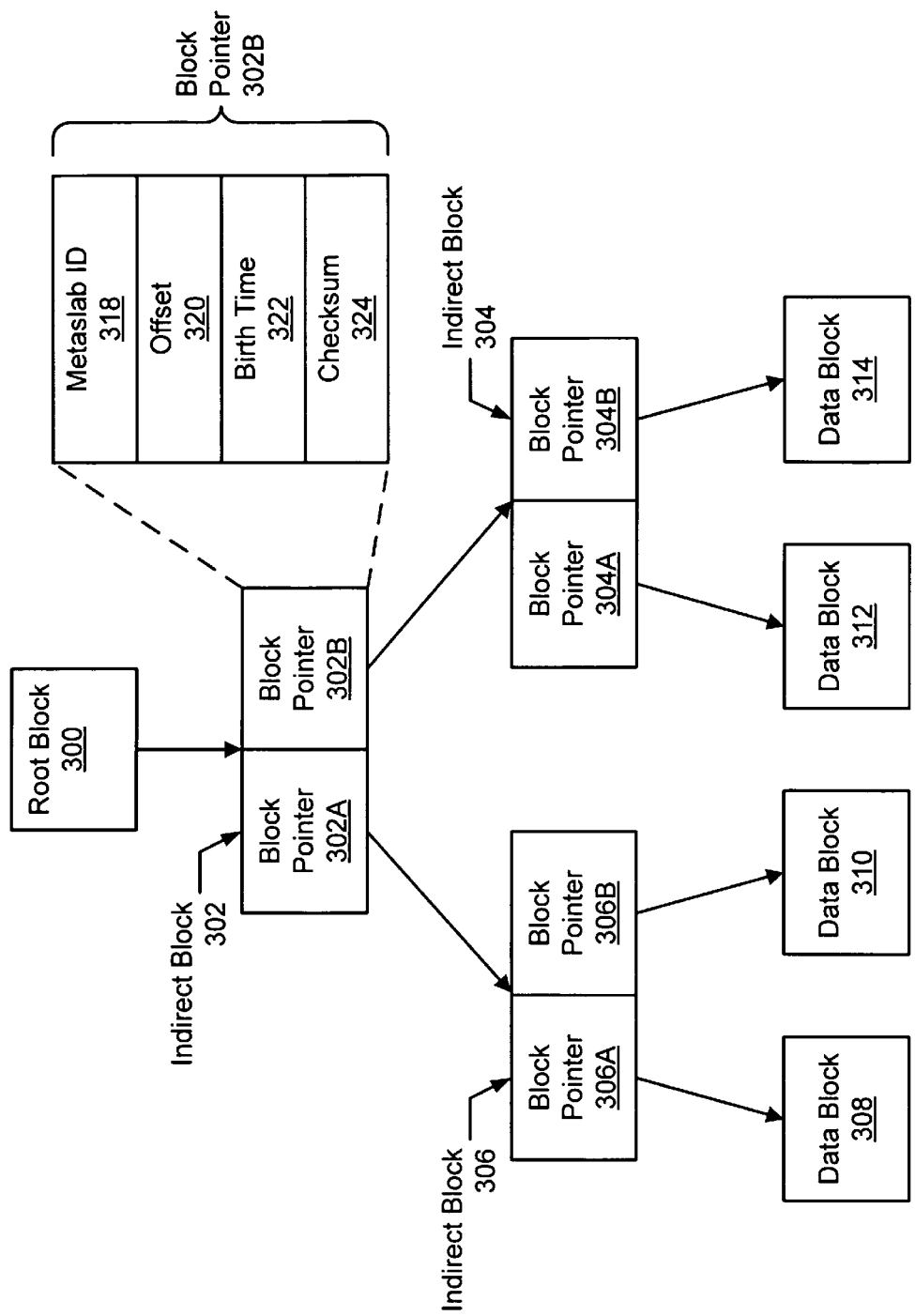
FIG. 3 shows a diagram of a hierarchical data configuration in accordance with one embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, 306). In one embodiment of the invention, indirect blocks (302, 304, 306) may be arrays of block pointers (e.g., 302A, 302B, etc.) that, directly or indirectly, reference to data blocks (308, 310, 312, 314). The data blocks (308, 310, 312, 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather, data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
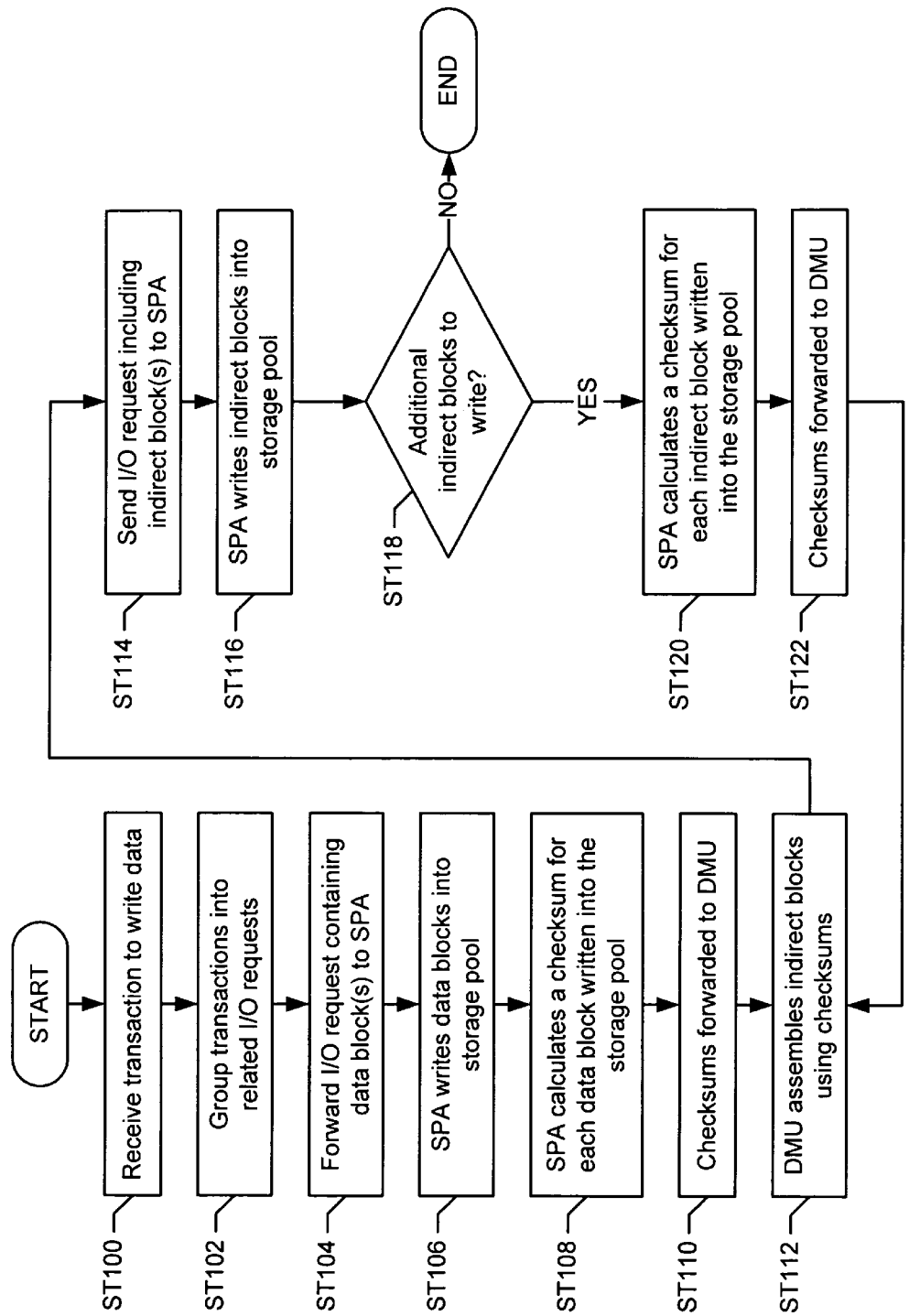
FIGS. 4-5 show a flow chart in accordance with one embodiment of the invention.

FIG. 4 shows a flow chart in accordance with one embodiment of the invention. Specifically, using the infrastructure shown in FIGS. 1-3, the following discussion of FIG. 4 describes a method for writing a block (i.e., a data block or indirect block) in accordance with one embodiment of the invention. Initially, the DMU receives a transaction from an application, the operating system (or a subsystem therein), etc. (ST100). The DMU subsequently groups the transaction into one or more I/O requests (ST102). The I/O requests are subsequently forwarded to the SPA (ST104).

In one embodiment of the invention, the transaction includes one or more data blocks, and/or one or more indirect blocks. As noted above, the file system is stored on disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, I/O request referenced in ST104 includes data blocks.

Continuing with the discussion of FIG. 4, the SPA, upon receiving the I/O request including data blocks from the DMU, writes the data blocks into the storage pool (ST106). The SPA subsequently calculates a checksum for each data block written into the storage pool (ST108). In one embodiment, the checksum module (e.g., 203 in FIG. 2) within the SPA is used to calculate the checksum for each data block written into the storage pool. The checksums are subsequently forwarded to the DMU (ST110). The DMU then assembles the indirect blocks using the checksums (ST112). Specifically, the DMU places the checksum for a given data block in the appropriate block pointer within the indirect block (i.e., the parent indirect block of the data block). Next, the indirect blocks are forwarded to the SPA (ST114). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST116). A determination is then made whether additional indirect blocks exist to write into the storage pool (i.e., whether the last indirect block written to the storage pool corresponds to the root block) (ST118). If no additional indirect blocks exist, then the method is complete. However, if additional indirect blocks exist, then the SPA calculates the checksum from each of the indirect blocks written into the storage pool (ST120). The checksums for each of the indirect blocks is subsequently forwarded to the DMU (ST122). Steps ST112 through ST122 are subsequently repeated until the root block is written into the storage pool.

In one embodiment of the invention, to write a logical block (i.e., a data block or indirect block) to a storage pool (e.g., ST106 or ST116 of FIG. 4), the SPA must allocate a physical block in which to write the logical block. Specifically, in one embodiment of the invention, a physical block is allocated for the logical block using a block allocation policy. More specifically, in one embodiment of the invention, the block allocation policy is based on metadata associated with the logical block. Alternatively, in one embodiment of the invention, the block allocation policy is based on criteria other than metadata. For example, the block allocation policy may be based on latency information about one or more disks in the storage pool. Those skilled in the art will appreciate that more than one allocation policy may be used, and that a combination of metadata-based, latency-based, and/or any other type of allocation policies may be used.

Figure 5:
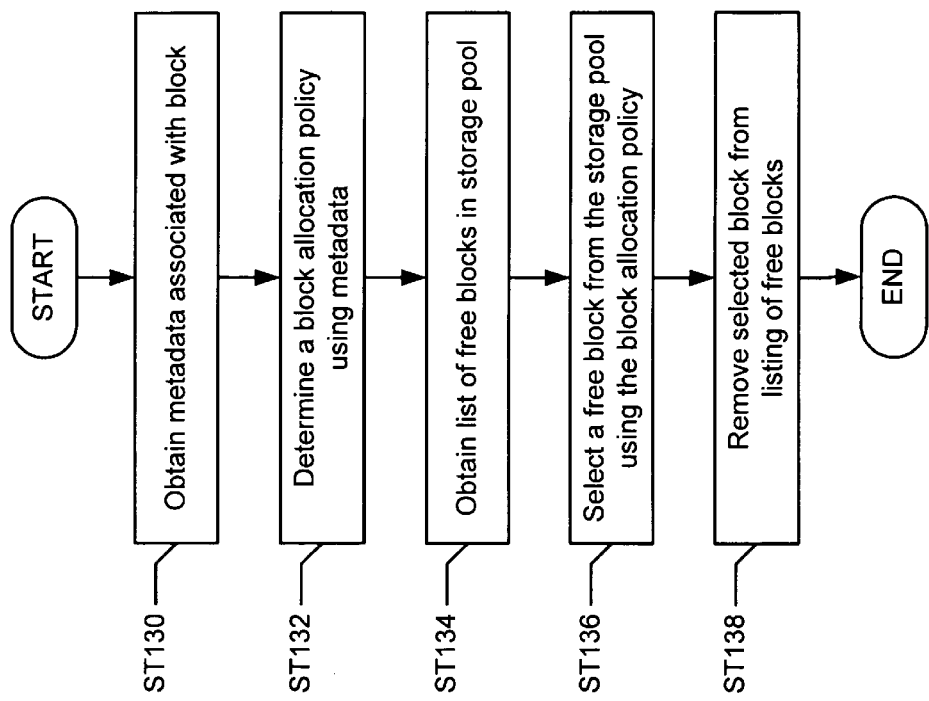

FIG. 5 shows a flow chart in accordance with one embodiment of the invention. More specifically, FIG. 5 describes a method for determining which of the free physical blocks in the storage pool to allocate in accordance with one embodiment of the invention. In the following descriptions, a block allocation policy based on metadata associated with a logical block is used. However, those skilled in the art will appreciate that any other allocation policy or combination of allocation policies may be used.

Turning to FIG. 5, once a request to write a logical block to the storage pool has been received (e.g., ST100 in FIG. 4), metadata associated with the logical block is obtained (ST130). In one embodiment of the invention, the metadata may include information about the type of the logical block (e.g., the block is part of a graphics file), the application which initiated the request that the logical block be written to disk, etc. In one embodiment of the invention, the metadata is passed to the SPA with the write request.

A block allocation policy is subsequently selected using the metadata (ST122). In one embodiment of the invention, selecting the block allocation policy using the metadata includes determining the block allocation policy associated with the logical block being stored, where the logical block is defined using the metadata. Those skilled in the art will appreciate that any mechanism (e.g., data structure, program logic, etc.) may be used to determine the block allocation policy to use to store the logical block.

In one embodiment of the invention, the block allocation policy defines how to select a particular physical block given a list of free physical blocks. The system implementing the invention may include any number of allocation policies. Further, the block allocation policies may "pluggable," i.e., they may be added and removed from the system during run-time. Continuing with the discussion of FIG. 5, once the block allocation policy is selected, a list of free physical blocks in the storage pool is obtained (ST124). In one embodiment of the invention, the list of free physical blocks is obtained by a process that maintains a data structure for physical block availability, i.e., free and used physical blocks across one or more disks in the storage pool.

A free physical block is subsequently selected from the list of free physical blocks using the block allocation policy (ST126). Once the physical block is selected, the aforementioned data structure that tracks physical block availability is updated to reflect that the selected physical block (i.e., the block selected in ST126) is no longer free. At this stage, the logical block is written to the allocated physical block.

Those skilled in the art will appreciate that a logical block may be larger than the physical block. For example, the logical block may be 1 K and the physical block may be 512 bytes. In such cases, multiple physical blocks may be allocated using the method described in FIG. 5.

Those skilled in the art will appreciate that the method of FIG. 5 separates the policy for physical block allocation from the mechanism for tracking physical block availability, which allows for pluggable block allocation modules, as described above, and further allows for block allocation modules to be added and removed from the system without requiring reformatting of any storage devices. Further, by supporting a plurality of allocation policies based on logical block metadata, disk latency, and/or other criteria, system performance may be optimized or otherwise manipulated based on changeable system and/or user-defined criteria. These criteria may provide optimizations, for example, for specific file types benefiting from particular allocation policies.

Figure 6:
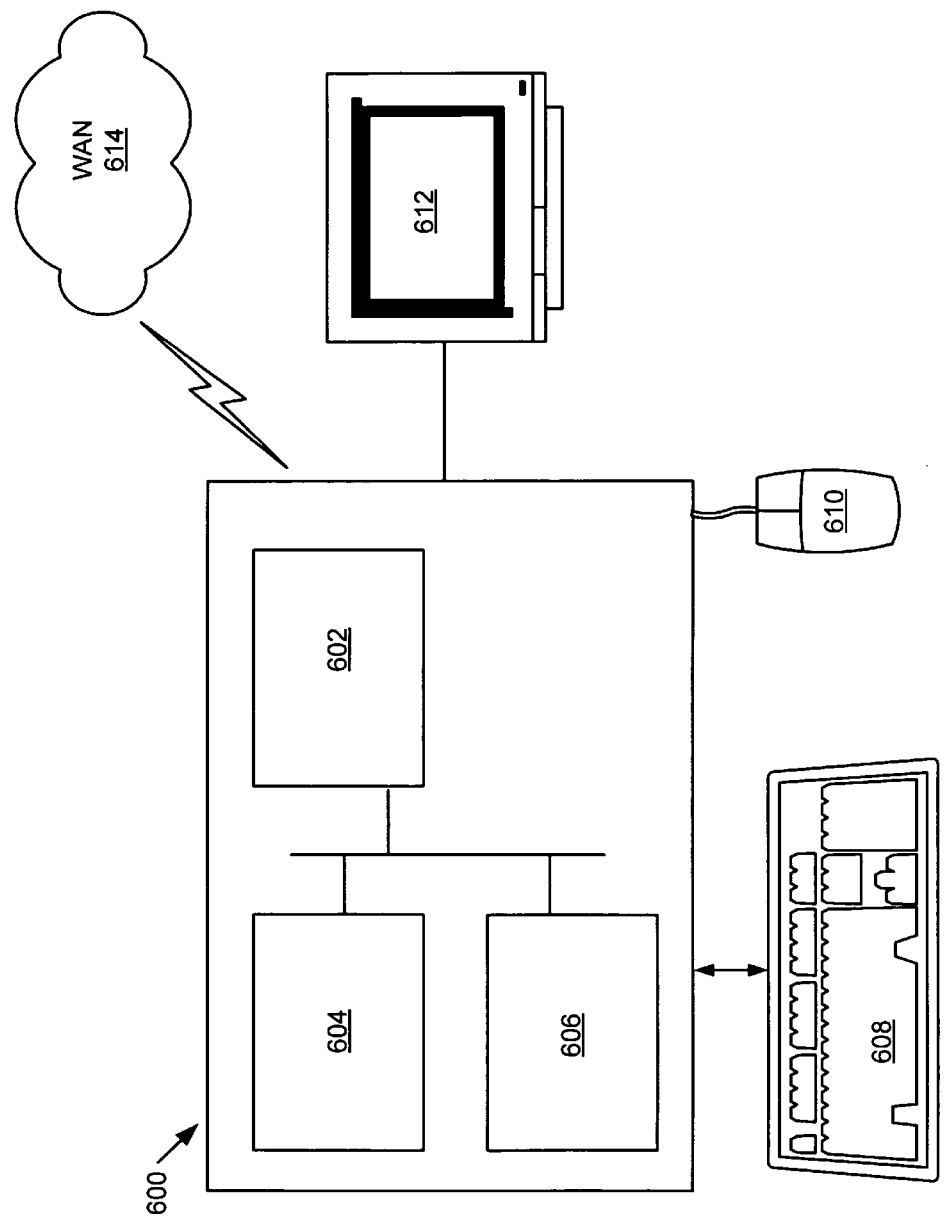
FIG. 6 shows a diagram of a computer system in accordance with one embodiment of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) may be connected to a local area network (LAN) or a wide area network (e.g., the Internet) (614) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., operating system, file system, system call interface, DMU, SPA, storage pool, disk, metaslab allocator, I/O management module, compression module, encryption module, checksum module, root block, data block, indirect block, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for writing logical blocks into a storage pool organized in a hierarchical tree structure, comprising:
    receiving a request to write first logical block;
    selecting a block allocation policy, by a file system associated with the storage pool, from a plurality of allocation policies;
    obtaining a list of free physical blocks in the storage pool;
    allocating a first physical block from the list of free physical blocks, based on the block allocation policy;

writing the first logical block to the first physical block on a first level of the hierarchical tree structure;

calculating a first checksum for the first logical block;

assembling a second logical block, wherein the second logical block comprises a first block pointer that stores the first checksum and references the first logical block;

allocating a second physical block from the list of free physical blocks, based on the block allocation policy;

writing the second logical block to the second physical block on a second level of the hierarchical tree structure;

calculating a second checksum for the second logical block;

assembling a third logical block, wherein the third logical block comprises a second block pointer that stores the second checksum and references the second logical block;

allocating a third physical block from the list of free physical blocks, based on the block allocation policy; and writing the third logical block to the third physical block on a third level of the hierarchical tree structure.

2. The method of claim 1, further comprising:

obtaining metadata associated with the first logical block, wherein the block allocation policy is selected from the plurality of allocation policies using the metadata.

3. The method of claim 2, wherein the metadata identifies a type of file with which the first logical block is associated.

4. The method of claim 2, wherein the metadata identifies an application that initiated the request.

5. The method of claim 1, further comprising:

adding a new allocation policy to the plurality of allocation policies, at run-time, such that the new allocation policy may be used by the file system.

6. The method of claim 1, wherein the first logical block is a data block and the second logical block is an indirect block.

7. The method of claim 1, wherein writing the first logical block to the physical block comprises writing a portion of the first logical block to the first physical block, when the first logical block is larger than the first physical block.

8. The method of claim 1, wherein the block allocation policy uses a latency of at least two disks in the storage pool to allocate the first physical block.

9. A system comprising:

a storage pool organized in a hierarchical tree structure; and a file system operatively connected to the storage pool and configured to:

receive a request to write a first logical block;

select a block allocation policy from a plurality of allocation policies;

obtain a list of free physical blocks in the storage pool;

allocate a first physical block from the list of free physical blocks based on the block allocation policy;

write the first logical block to the first physical block on a first level of the hierarchical tree structure;

calculate a checksum for the first logical block;

assemble a second logical block, wherein the second logical block comprises a block pointer that stores the checksum and references the first logical block;

allocate a second physical block from the list of free physical blocks, based on the block allocation policy;

write the second logical block to the second physical block on a second level of the hierarchical tree structure;

calculate a second checksum for the second logical block;

assemble a third logical block, wherein the third logical block comprises a second block pointer that stores the second checksum and references the second logical block;

allocate a third physical block from the list of free physical blocks, based on the block allocation policy; and write the third logical block to the third physical block on a third level of the hierarchical tree structure.

10. The system of claim 9, wherein the file system is further configured to:

obtain metadata associated with the first logical block, wherein the block allocation policy is selected from the plurality of allocation policies using the metadata.

11. The system of claim 10, wherein the metadata identifies an application that initiated the request.

12. The system of claim 10, wherein the metadata identifies a type of file with which the first logical block is associated.

13. The system of claim 9, wherein the file system is further configured to:

add a new allocation policy to the plurality of allocation policies, at run-time, such that the new allocation policy may be used by the file system.

14. The system of claim 9, wherein the first logical block is a data block and the second logical block is an indirect block.

15. The system of claim 9, wherein writing the first logical block to the first physical block comprises writing a portion of the first logical block to the first physical block, when the first logical block is larger than the first physical block.

16. A computer readable medium comprising instructions, which when executed by a processor, cause the processor to perform a method for writing logical blocks into a storage pool organized in a hierarchical tree structure by:

receiving a request to write a first logical block;

selecting a block allocation policy, by a file system associated with the storage pool, from a plurality of allocation policies;

obtaining a list of free physical blocks in the storage pool;

allocating a first physical block from the list of free physical blocks, based on the block allocation policy;

writing the first logical block to the first physical block on a first level of the hierarchical tree structure;

calculating a checksum for the first logical block;

assembling a second logical block, wherein the second logical block comprises a block pointer that stores the checksum and references the first logical block;

allocating a second physical block from the list of free physical blocks, based on the block allocation policy;

writing the second logical block to the second physical block on a second level of the hierarchical tree structure;

calculating a second checksum for the second logical block;

assembling a third logical block, wherein the third logical block comprises a second block pointer that stores the second checksum and references the second logical block;

allocating a third physical block from the list of free physical blocks, based on the block allocation policy; and writing the third logical block to the third physical block on a third level of the hierarchical tree structure.

17. The computer readable medium of claim 16, further comprising instructions executable by the processor for writing logical blocks into the storage pool by:

obtaining metadata associated with the first logical block, wherein the block allocation policy is selected from the plurality of allocation policies using the metadata.

18. The computer readable medium of claim 17, wherein the metadata identifies one selected from a group consisting of a type of file with which the first logical block is associated and an application that initiated the request.

19. The computer readable medium of claim 16, further comprising executable instructions executable by the processor for writing logical blocks into the storage pool by:

adding a new allocation policy to a system comprising the storage pool, at run-time, such that the new allocation policy may be used by the system.

20. The computer readable medium of claim 16, wherein the logical block is a data block and the second logical block is an indirect block.

* * * * *